United States Patent [19]

Terai et al.

[11] Patent Number: 5,004,628
[45] Date of Patent: Apr. 2, 1991

[54] COATING METHOD AND APPARATUS

[75] Inventors: Fumitaka Terai; Kimio Yukawa; Mineo Suyefuji; Hiroki Saito; Shigeru Yamaguchi, all of Kanagawa, Japan

[73] Assignee: Fuji Photo Film Co., Ltd., Kanagawa, Japan

[21] Appl. No.: 470,399

[22] Filed: Jan. 26, 1990

Related U.S. Application Data

[63] Continuation of Ser. No. 196,404, May 20, 1988, abandoned.

[30] Foreign Application Priority Data

May 22, 1987 [JP] Japan .................................. 62-124034

[51] Int. Cl.$^5$ .................................................. B05D 1/26
[52] U.S. Cl. .................................. 427/389.9; 118/410; 118/411; 427/128
[58] Field of Search .......................... 118/410, 411; 427/389.9; 425/131.1, 461

[56] References Cited

U.S. PATENT DOCUMENTS

| 2,522,632 | 9/1950 | Nicoli | 425/461 |
| 3,529,050 | 9/1970 | Smith | 425/131.1 X |
| 3,634,126 | 1/1972 | Cain et al. | 427/389.9 |
| 3,637,427 | 1/1972 | Tsuruta et al. | 427/389.9 |
| 3,644,081 | 2/1972 | Matsuda et al. | 427/389.9 X |
| 3,886,973 | 6/1975 | Kinney | 425/131.1 X |
| 4,115,172 | 9/1978 | Baboff et al. | 118/410 X |
| 4,684,568 | 8/1987 | Lou | 427/389.9 |

Primary Examiner—Shrive Beck
Attorney, Agent, or Firm—Sughrue, Mion, Zinn, Macpeak & Seas

[57] ABSTRACT

In a coating method using a coating head having a coating solution supplying inlet and a slot opening, the coating solution is caused to flow from the inlet to the slot opening in such a manner that the flow width increases gradually while the flow thickness decreases gradually. An apparatus according to the invention has a coating head in which a flow path is formed between an inlet and a slot opening, such that the flow width gradually increases while the flow thickness gradually decreases.

2 Claims, 2 Drawing Sheets

COATING METHOD AND APPARATUS

This is a continuation of application Ser. No. 07/196,404, filed May 20, 1988, now abandoned.

BACKGROUND OF THE INVENTION

This invention relates to a method of applying a variety of coating solutions to supports made of plastic film, paper, or the like, and to an apparatus for practicing the method. More particularly, the invention relates to a method in which, in the manufacture of photographing photo-sensitive materials (such as photographic films and papers) and magnetic recording materials (such as magnetic recording tapes), coating solutions (such as photographic emulsions and magnetic solutions) are applied to belt-shaped supports (hereinafter referred to merely as "webs", when applicable), and an apparatus for practicing the method.

A method in which a coating solution is applied to a support made of plastic film or paper and dried to form a certain product has been extensively employed in the field of manufacture of photographic films and papers, magnetic materials, pressure-sensitive recording sheets and heat-sensitive recording sheets, and thin film macromolecular materials.

One example of a method which is extensively employed for coating a web with a liquid-phase coating compound is a method using a multi-layer slide bead coating apparatus which has been described in the specification of U.S. Pat. No. 2,761,791 to Russell et al. In the method, a plurality of coating solutions flow down a sloped surface (or slide surface), to form a bead at the lower end of the slide surface where the coating solutions meet the web which is moving thereby, so that coating is achieved with the aid of the bead thus formed.

A single-layer or multi-layer coating apparatus used in a slide bead coating method, extrusion bead coating method, hopper coating method and curtain coating method will be described with reference to FIG. 1. In the apparatus, a coating solution 2 is supplied into a coating head 1 by a metering pump 9. More specifically, the solution 2 is first supplied into a cavity 5 through a coating solution supplying pipe 3 and a coating solution supplying inlet 4. The solution 2 is then delivered through a slot 6 to a slot opening 7, where it is applied to a web 8. The apparatus generally employs a differential pressure chamber 11 for achieving a stable coating operation. In the apparatus, the uniformity in thickness of the coating in the widthwise direction of the web depends on the precision of the slot 6 and the slot opening 7. Accordingly, it is essential to form the slot opening 7 with extremely high accuracy.

However, the conventional coating head suffers from serious drawbacks. In the cavity 5, the slot 6 and/or the slot opening 7, the coating solution 2 contained therein forms residue deposits like cake, thus making it difficult to form a coating uniform in thickness in the widthwise direction of the web. Furthermore, some of the residues thus formed may stick to the coating or may form streaks on the coating.

It is quite difficult to remove the residue through the slot opening. Accordingly, it is necessary to disassemble and wash the coating head for removal of the residue. This cleaning process takes a relatively long time.

If the coating operation is carried out for a long period of time, in the head, especially in the cavity 5, the flow of the solution 2 is liable to be retarded. Where the solution is photographic emulsion, a thickener whose viscosity increases with time such as gelatin bridged material formed by a hardening agent is formed. Where the coating is magnetic material, the dispersant will condense, thus forming the residue which can accumulate in the cavity 5 or can clot the slot opening. The residue thus formed makes the thickness of the coating non-uniform in the widthwise direction of the web and reduces the quality of the product.

As was described above, the solution 2 is supplied into the cavity in the head 1 through the tube 3 by the pump 9, and is then delivered through the slot 6 to the slot opening 7, through which the coating solution is distributed on the web. That is, in this operation, the solution is abruptly spread over the entire width of the coating head. Therefore, the coating solution flow is liable to be retarded at the edges of the flow path or where the flow path is abruptly expanded or contracted. It is very difficult to design a cavity which, when a coating solution is applied to the web, will minimize residue formation. Especially when a general purpose coating head is required, it is impossible to design the head so as to prevent the retardation of the flow therein.

To eliminate the above-described difficulties, a coating apparatus having a coating head in which the cavity spreads radially in the form of a triangle from the coating solution supplying inlet towards the slot opening has been proposed (cf. Japanese Patent Application Publication No. 48146/1984). In addition, for the same purpose, a method has been proposed in which, to prevent the retardation of the coating solution flow at the ends of the cavity, auxiliary solution supplying tubes are provided at the cavity ends to inject the solution thereinto and discharge it therefrom (cf. U.S. Pat. No. 4,623,501).

However, in the conventional coating method and apparatus, it is still difficult to substantially eliminate the above-described difficulties that the coating is not uniform in thickness over the entire width of the web and foreign matters such as the residue of the solution sometimes becomes part of the coating.

SUMMARY OF THE INVENTION

Accordingly, an object of this invention is to eliminate the above-described difficulties accompanying a conventional coating method or apparatus.

More specifically, an object of the invention is to provide a coating method in which the insufficient dispersion and the non-uniform density of the coating solution caused by retention of the solution in the head are eliminated. That is, a solution having uniform density and being well dispersed is supplied to the slot opening in such a manner as to cover the entire width thereof, so that the coating formed on the web is uniform in thickness and high in quality. Another object of the invention is to provide a coating apparatus for practicing the method.

The foregoing object and other objects of the invention have been achieved by a coating method in which solution is supplied into a coating head through an inlet and is extruded through a slot opening and applied to a continuously running web. According to the invention, in the coating head the coating solution is caused to flow from the supplying inlet to the slot opening in such a manner that the flow width is gradually increased while the flow thickness is gradually decreased. In the inventive apparatus, in which a head is used to apply solution to the web, the head has an inlet provided substantially at the middle of the width of the coating head. There also is a slot opening having a predetermined width, and a coating solution flow path which extends through the head from the inlet to the slot opening. The flow path is a triangular slot with the inlet at a vertex and tapered in section from the inlet. Preferably, the vertex of the triangle has an angle $\theta$ equal to or smaller than 40°, and the slot is tapered in section at an angle $\alpha$ equal to or smaller than 0.35°.

In the invention, to allow the solution to flow from the inlet to the slot opening, the flow path width is gradually increased while the flow path thickness is gradually decreased. That is, at least at a part of the flow path, the edges thereof are gradually changed, and while the width is increased, the thickness is decreased. Furthermore, the divergent angle and the convergent angle of the flow path are limited, so that the solution flow does not suffer from the formation of vortexes. That is, so the coating solution may flow smoothly in the coating head.

One way in which the coating method and apparatus of the invention differ from the conventional method and apparatus is that a cavity is not formed in the inventive coating head.

The nature, principle and utility of the invention will become more apparent from the following detailed description when read in conjunction with the accompanying drawings.

DETAILED DESCRIPTION OF THE PREFERRED EMBODIMENT

Figure 2:
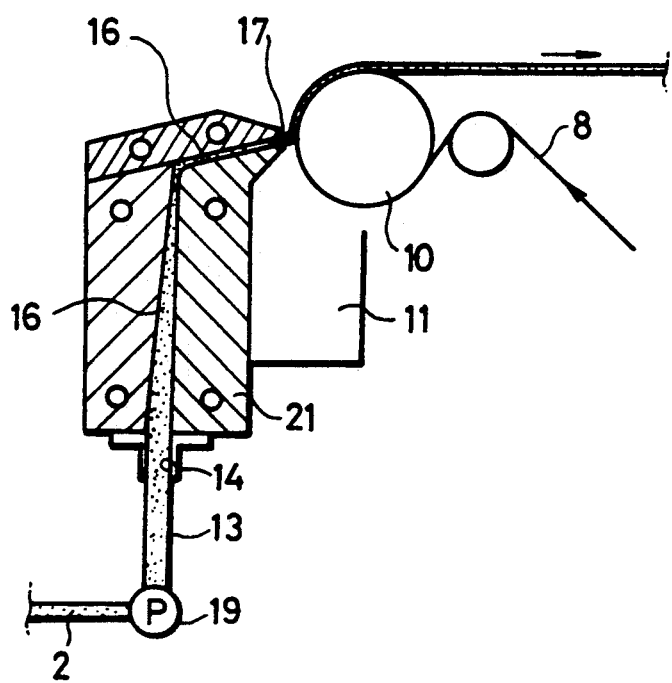
FIGS. 2 and 3 are sectional views showing one example of a coating apparatus according to this invention.
Figure 3:
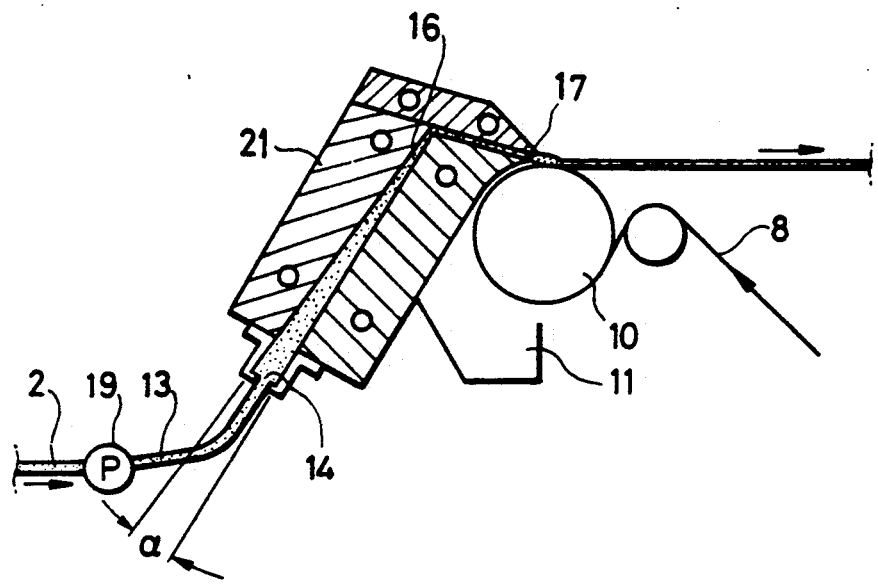

With reference to FIGS. 2 and 3, one example of a coating apparatus according to the invention will be described. In the apparatus, coating solution 2 is supplied into a coating head 21 through a supplying pipe 13 and a supplying inlet 14 by a metering pump 19. The solution is then delivered through a slot 16 to a slot opening 17 where it is applied to a web 8 running on a coating roller 10.

Figure 1:
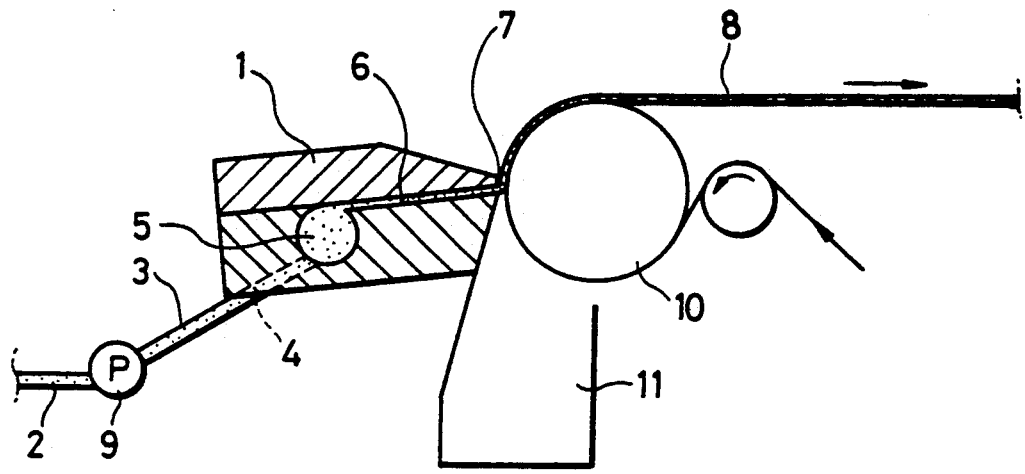
FIG. 1 is a sectional view showing a conventional coating apparatus.

The difference between FIGS. 1 and 2 resides merely in the position of the head 21 with respect to the roller 10.

In the invention, the solution is supplied through the inlet 14 into the slot with the width increased gradually and with the thickness decreased gradually, i.e. at a gentle angle, preferably uniformly. Therefore, the slot (flow path) 16 of the head 21 according to the invention is longer than that of the conventional coating apparatus. Accordingly, in the invention, the coating head is disposed as shown in FIG. 2 or 3.

In the case of FIG. 3, it is preferable that the angle $\alpha$ of convergence of the slot 16 be equal to or smaller than 0.35° ($\alpha \leq 0.35°$).

Figure 4:
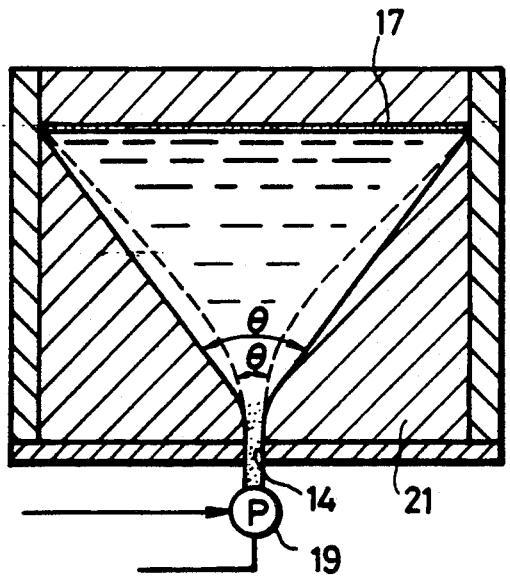
FIGS. 4 and 5 are a sectional front view and a perspective view showing details of a coating head in the coating apparatus according to the invention, respectively.
Figure 5:
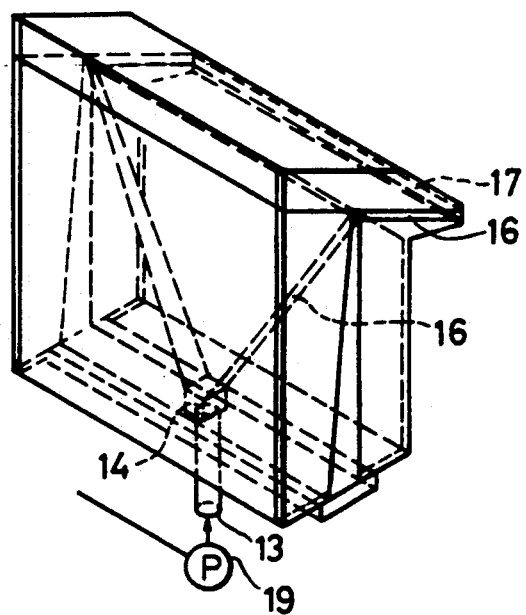

The coating head of FIG. 2 is shown in FIGS. 4 and 5 in more detail. As is apparent from FIG. 4, the width of the slot 16 between the inlet 14 and the slot opening 17 is made larger towards the opening 17. It is ideal that the width is increased as in a venturi tube, or as indicated by the broken lines in FIG. 4. Thus, the width of the flow path presents a flared surface which curves outwardly from an upstream portion of the flow path toward the slot opening. However, for simplification in manufacture, the width of the slot is, in general, increased linearly with a angle $\theta$ of divergence smaller than or equal to 40° ($\theta \leq 40°$). The width and the thickness of the slot will become more apparent from the perspective view of FIG. 5.

As was described above, in the invention, while the coating solution is allowed to flow from the supplying inlet to the slot opening, the width of the flow path is gradually increased while its thickness is gradually decreased, so that the solution flow is prevented from being abruptly expanded or contracted. More specifically, the flow path is gradually expanded so that the formation of vortexes (retardation of the coating solution) along the edge lines of the flow path is prevented. Furthermore, in the flow path, the width is increased in inverse proportion to the thickness so that the flow resistance is uniformly distributed therein. In other words, the divergent angle $\theta$ and the convergent angle $\alpha$ of the slot are set to suitable values. More specifically, the divergent angle $\theta$ is made equal to or smaller than 40° and the convergent angle $\alpha$ is made equal to or smaller than 0.35° so that the formation of vortexes is prevented, and the coating solution flows smoothly.

In the coating head of the invention, there is no cavity. This is to eliminate the difficulty that, when the coating solution flows out of the cavity into the slit, vortexes are formed along the border line between the cavity and the slit because the flow is forcibly contracted there, and the flow is partially retarded by the vortexes thus formed.

Typical examples of the invention will now be described.

EXAMPLE 1

The coating head as shown in FIG. 2 was used to apply a polyacrylic amide solution 13% in density and 12 cps in viscosity at room temperature to a polyethylene terephthalate (PET) film 18 cm in width and 175 μm in thickness at a coating speed of 1 m/min.

The slot formed in the coating head had a divergent angle $\theta$ of 40° and a convergent angle $\alpha$ of 0.35°.

Coating was performed using the head for as long as eight hours; however, the resultant product had no defects such as coating steaks. That is, the coating was uniform in thickness.

EXAMPLE 2

The same coating solution as in the above-described example was applied to the same PET film by using the following coating head: The slot formed in the head had a divergent angle $\theta$ of 45° and a convergent angle $\alpha$ of 0.5°. Coating was successfully performed using the head for as long as three hours. After continuous coating for three hours, the tendency of the thickness of the coating layer formed was thinner towards the both edges than at the center, and occurrence of the slight coating streaks were observed.

As was described above, in the coating method of the invention, the coating head is formed such that the coating solution is supplied from the supplying inlet to the slot opening in such a manner that the width is gradually increased while the thickness is gradually decreased. Accordingly, in the apparatus of the invention, the coating solution flow path in the head extends from the inlet to the slot opening and is formed in such a manner that it has no cavity and the width is gradually increased while the thickness is gradually decreased. Therefore, even if the coating apparatus is operated for a long period of time, the product is free from defects such as coating streaks and the coating formed is uniform in thickness over the entire width of the web. In addition, the interval at which the coating head is cleaned can be considerably longer than that of conventional coating heads. Thus, the invention will contribute greatly not only to improving the quality of coatings but also to increasing the efficiency of the coating operation.

What is claimed is:

1. A coating method comprising the steps of:
   (a) supplying a polyacrylic amide coating solution 13% in density and 12 cps in viscosity at room temperature to an inlet of a coating head;
   (b) causing the solution to flow through the head from the inlet along a flow path increasing in width at an angle of divergence equal to 40° while decreasing in thickness at an angle of convergence equal to 0.35° to a slot opening in the head; and
   (c) extruding the solution from the slot opening onto a moving web of polyethylene terephthalate film at a coating speed of 1 m/mm to form a coating of a desired width and thickness.

2. A coating method comprising the steps of:
   (a) supplying a polyacrylic amide coating solution 13% in density and 12 cps in viscosity at room temperature to an inlet of a coating head;
   (b) causing the solution to flow through the head from the inlet along a flow path increasing in width at an angle of divergence $\Theta$, where $\Theta$ is defined by the expression $30° \leq \Theta \leq 40°$, while decreasing in thickness at an angle of convergence $\alpha$, where $\alpha$ is defined by the expression $0.25° \leq \alpha \leq 0.35°$, to a slot opening in the head; and
   (c) extruding the solution from the slot opening onto a moving web to form a coating of a desired width and thickness.

* * * * *